C. Livingston,
Cutter Head.

N° 56,424. Patented July 17, 1866.

Witnesses:
Inventor:
C. Livingston

UNITED STATES PATENT OFFICE.

CHAS. LIVINGSTON, OF REDWOOD CITY, CALIFORNIA.

IMPROVEMENT IN CUTTERS FOR WOOD-PLANING MACHINES.

Specification forming part of Letters Patent No. 56,424, dated July 17, 1866.

*To all whom it may concern:*

Be it known that I, CHARLES LIVINGSTON, of Redwood City, in the county of San Mateo and State of California, have invented a new and Improved Adjustable Cutter; and I do hereby declare that the following is a full, clear, and exact description thereof, which will enable others skilled in the art to make and use the same, reference being had to the accompanying drawings, forming a part of this specification.

The present invention relates to a new and improved arrangement of cutters to and upon their head for the tonguing and grooving of boards, whereby the cutters are susceptible of being adjusted upon their head, so as to produce a tongue or groove of a uniform size.

In accompanying plate of drawings my improvement is illustrated.

Figure 1:
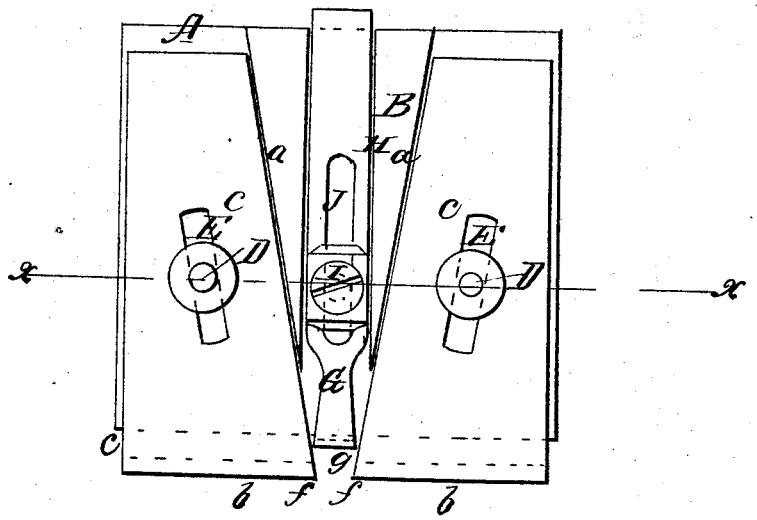
Figure 2:
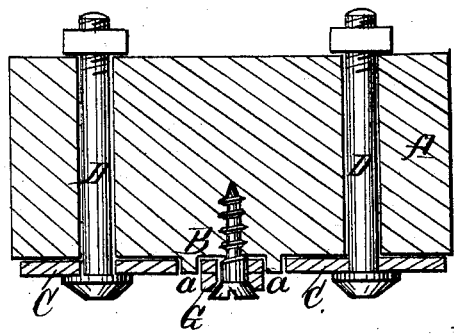

Figure 1 is a view of one side of the cutter-head, showing the arrangement of the several cutters therein, and Fig. 2 a transverse vertical section taken in the plane of the line $x\ x$, Fig. 1.

Similar letters of reference indicate like parts.

A in the drawings represents the cutter-head, cut away upon one of its sides, so as to leave a center wedge-shaped piece, B, against and upon each inclined side $a$ of which, is placed a similar cutter-blade, C, with their cutting-edges $b$ projecting beyond and parallel to the same edge $c$ of the cutter-head A. These cutter-blades $c$ are both secured or fastened to the head A by a set-screw, D, for each blade, passing through a slot, E, of the same and screwing into the head, the said slots being both parallel to the direction of the inclined sides of the wedge-piece B.

By unscrewing the set-screws D the cutter-blades are loosened, and can then be moved in or out, or so as to project more or less from the edge of the cutter-head, thus decreasing or increasing the distance between their two inner corners, $f\ f$, whereby a uniform width of tongue can always be cut by them, as by such adjustment of the same the wearing away of them from use and from being ground or resharpened is compensated for, as is obvious without further explanation.

G is the cutter-blade for grooving, arranged in a slot, H, through the center of the wedge-shaped piece B of the cutter-head, which cutter-blade is secured to the head by a set-screw, I, and slot J, similar to that explained for the cutters C, whereby it can be so set as to project more or less from the edge $c$ of the head, the width of the cutting-edge $g$ of the cutter G being equal to the width of the tongue cut by the cutters C.

I claim as new and desire to secure by Letters Patent—

The arrangement of the cutters C and G upon a suitable cutter-head, having a wedge-shaped center piece, B, substantially as and for the purposes described.

CHAS. LIVINGSTON.

Witnesses:
JOHN AMES,
T. W. LATHROP.